United States Patent
Wielens et al.

(10) Patent No.: US 9,898,939 B2
(45) Date of Patent: Feb. 20, 2018

(54) METHOD AND APPARATUS FOR PROVIDING A TIRE WITH AN INFORMATIVE LABEL, AND TIRE PROVIDED WITH SUCH A LABEL

(71) Applicant: Apollo Tyres Global R&D B.V., Enschede (NL)

(72) Inventors: Marcus Hendrikus Maria Wielens, Eibergen (NL); Andre Douma, Enschede (NL); Sytze Attema, Enschede (NL); Bart Snijders, Enschede (NL); Christi Houwers, Enschede (NL)

(73) Assignee: Apollo Tyres Global R&D B.V., Enschede (NL)

( * ) Notice: Subject to any disclaimer, the term of this patent is extended or adjusted under 35 U.S.C. 154(b) by 254 days.

(21) Appl. No.: 14/422,267

(22) PCT Filed: Sep. 26, 2013

(86) PCT No.: PCT/NL2013/050689
§ 371 (c)(1),
(2) Date: Feb. 18, 2015

(87) PCT Pub. No.: WO2014/051429
PCT Pub. Date: Apr. 3, 2014

(65) Prior Publication Data
US 2015/0194077 A1  Jul. 9, 2015

(30) Foreign Application Priority Data

Sep. 28, 2012 (NL) ........................................ 2009540
Dec. 4, 2012 (NL) ........................................ 2009931

(51) Int. Cl.
*B29C 65/00* (2006.01)
*G09F 3/02* (2006.01)
(Continued)

(52) U.S. Cl.
CPC ................ *G09F 3/02* (2013.01); *B65C 3/00* (2013.01); *G09F 3/04* (2013.01); *G09F 3/10* (2013.01);
(Continued)

(58) Field of Classification Search
CPC .............. B32B 37/142; B32B 38/0036; B32B 38/1875; B32B 3/20; Y10T 156/1008;
(Continued)

(56) References Cited

U.S. PATENT DOCUMENTS 1,800,599 A    4/1931  Cain
2,880,538 A *  4/1959  Autem ..................... B44C 1/16
                                                       156/361
(Continued)

FOREIGN PATENT DOCUMENTS

JP   H06-312604 A   11/1994
JP   2009-143195 A   7/2009
(Continued)

OTHER PUBLICATIONS

International Search Report for corresponding International Application No. PCT/NL2013/050689 dated Nov. 4, 2013.

*Primary Examiner* — Mark A Osele
*Assistant Examiner* — Nickolas Harm
(74) *Attorney, Agent, or Firm* — Renner, Otto, Boisselle & Sklar, LLP

(57) ABSTRACT

The invention relates to a method for providing a tire with an informative label. The method comprises supporting a tire, supplying a banding material to the tire and wrapping it in a loop around a part of the tire, holding the banding material at the neck of said loop, and connecting opposed areas of the banding material at said neck to form a label wrap. The invention further relates to an apparatus for carrying out the method and to a tire provided with the label.

(Continued)

Figure 1:
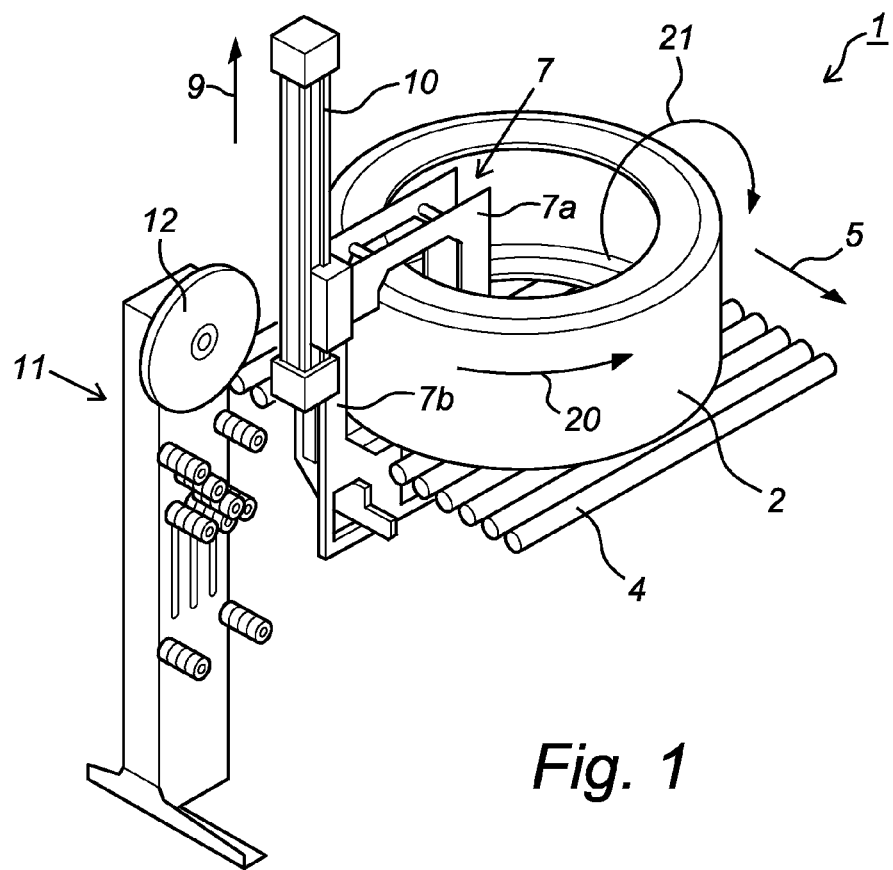

The informative label is easily removed by a mechanic and shows an improved processability and printability. The informative label further does not leave any adhesive or other residuals on a tire.

17 Claims, 4 Drawing Sheets

(51) Int. Cl.
| | |
|---|---|
| *B65C 3/00* | (2006.01) |
| *G09F 3/04* | (2006.01) |
| *G09F 3/10* | (2006.01) |
| *G09F 3/18* | (2006.01) |
| *G09F 23/00* | (2006.01) |
| *B32B 37/14* | (2006.01) |
| *G09F 3/20* | (2006.01) |
| *B32B 3/20* | (2006.01) |
| *B29C 65/16* | (2006.01) |
| *B29C 65/78* | (2006.01) |
| *B29C 65/22* | (2006.01) |

(52) U.S. Cl.
CPC ............... *G09F 3/18* (2013.01); *G09F 23/00* (2013.01); *B29C 65/16* (2013.01); *B29C 65/22* (2013.01); *B29C 65/7832* (2013.01); *B29C 65/7838* (2013.01); *B29C 65/7841* (2013.01); *B29C 66/4322* (2013.01); *B29C 66/4324* (2013.01); *B32B 3/20* (2013.01); *B32B 37/142* (2013.01); *G09F 3/20* (2013.01); *G09F 2003/0251* (2013.01); *Y10T 156/10* (2015.01); *Y10T 156/1008* (2015.01); *Y10T 156/1013* (2015.01); *Y10T 156/1038* (2015.01); *Y10T 156/17* (2015.01)

(58) Field of Classification Search
CPC ......... Y10T 156/1013; Y10T 156/1038; G09F 3/02; G09F 3/18; G09F 3/20; G09F 23/00; B29C 65/16; B29C 65/22; B29C 65/7832; B29C 65/7838; B29C 65/7841; B29C 66/4322; B29C 66/4324
USPC ... 156/95, 165, 187, 218, 272.8, 293, 304.1, 156/110.1, 421.6, 431, 443, 446, 450
See application file for complete search history.

(56) References Cited

U.S. PATENT DOCUMENTS

| | | | | |
|---|---|---|---|---|
| 2,990,158 | A * | 6/1961 | McCrory | B29D 30/64 254/50.3 |
| 5,264,066 | A * | 11/1993 | Lundell | B65C 3/00 156/361 |
| 2005/0039365 | A1 | 2/2005 | Rosa | |
| 2007/0295447 | A1* | 12/2007 | Symens | B65C 9/1884 156/277 |

FOREIGN PATENT DOCUMENTS

| | | |
|---|---|---|
| JP | 2011-201557 A | 10/2011 |
| WO | 2009/043084 A1 | 4/2009 |

* cited by examiner

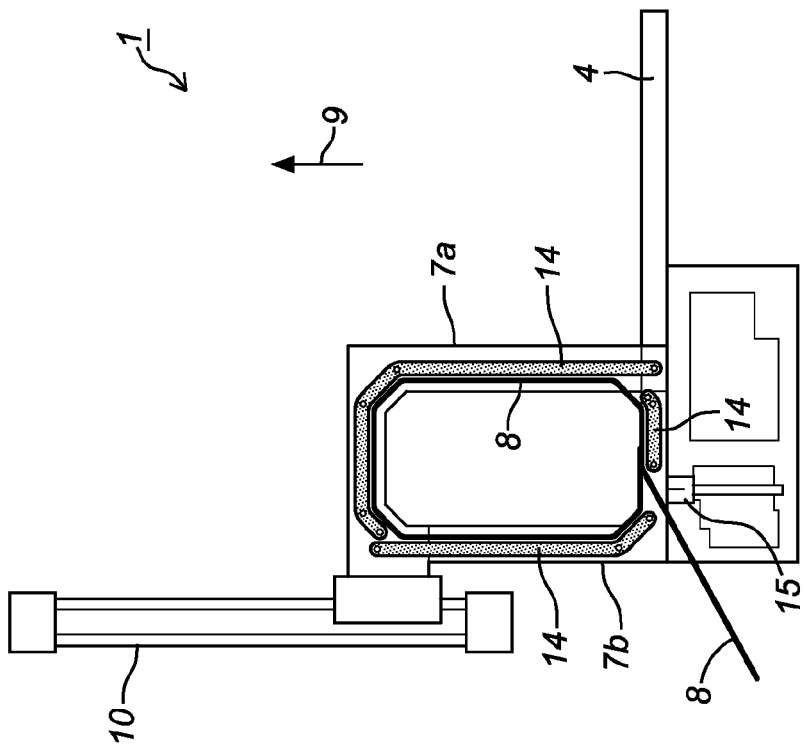
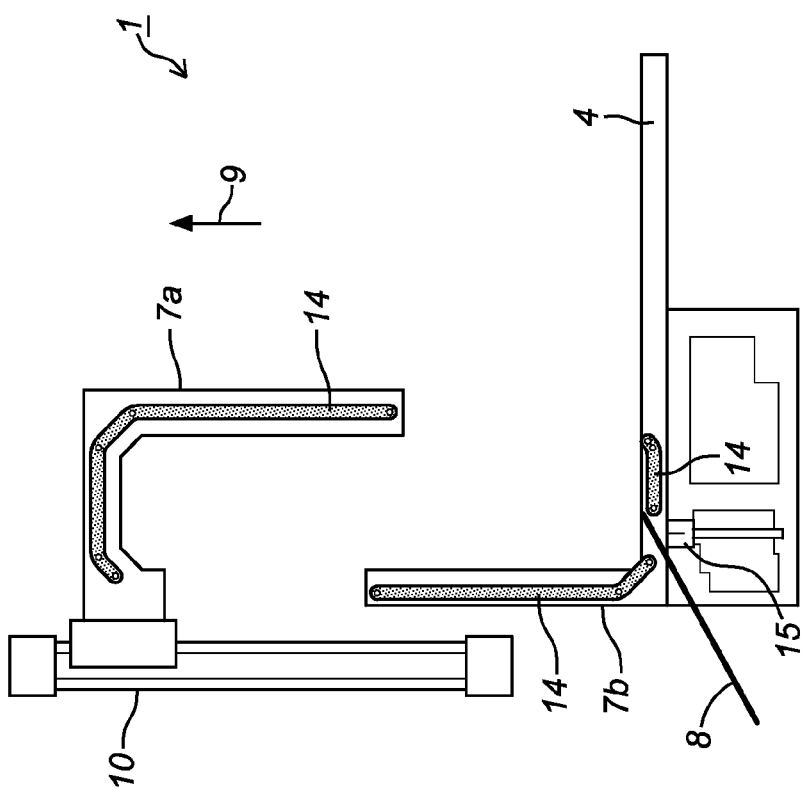
Fig. 4
Fig. 3

METHOD AND APPARATUS FOR PROVIDING A TIRE WITH AN INFORMATIVE LABEL, AND TIRE PROVIDED WITH SUCH A LABEL

This application is a national phase of International Application No. PCT/NL2013/050689 filed Sep. 26, 2013 and published in the English language, which claims priority to Application No. NL 2009540 filed Sep. 28, 2012 and Application No. NL 2009931 filed Dec. 4, 2012.

The present invention relates to a method and apparatus for providing a tire with an informative label. The invention further relates to a tire provided with an informative label that does not leave any adhesive or other residuals on a tire.

Tires are presently provided with an informative label when they leave a tire factory. The informative label carries product information that needs to be conveyed to stakeholders, such as garage keepers, tire centers and logistic collaborators. In this business chain, conveying product information such as tire size, product line and barcode is vital. Upon mounting a tire on a car, the label is typically removed and disposed of.

The known informative labels typically comprise a backing of silicone paper, provided on the back with a relatively thick adhesive layer to ensure adhesion to the tire rubber. The front side of the label is typically a printed polypropylene film. Although the known informative labels have been used for many years their application is not without problems. Labels tend to loosen from a tire after some time, they may become less readable and when removed may leave adhesive and other residuals on the tire.

It is an object of the present invention to provide an informative label for a tire that does not have some of the disadvantages of the labels known in the art. It is a further object to provide a method and apparatus for providing such a label to a tire.

To this end a method for providing a tire with an informative label is provided, the method comprising supporting a tire, supplying banding materials to the tire and wrapping it in a loop around a part of the tire, holding the banding material at the neck of said loop, and connecting opposed areas of the banding material at said neck.

The invention further provides an apparatus for providing a tire with an informative label, the apparatus comprising means for supporting a tire, means for supplying banding materials to the tire and wrapping it in a loop around a part of the tire, clamps for holding the banding material at the neck of said loop, and a device for connecting opposed areas of the banding material at said neck.

The method and apparatus in accordance with the invention provide a label for a tire in the form of a wrap. Such a wrap is easily removed by a mechanic which saves time. A further advantage of the wrapped label in accordance with the invention is that its processability and printability in particular is improved. Bleeding out of the adhesive layer in the known label no longer needs to occur which prevents adhesive to adhere to printing machinery and the like.

In an embodiment of the invention, a method is provided wherein the banding material is guided around the part of the tire by guiding it along a loop shaped guiding structure. This allows to wrap virtually any part of the tire, and in particular a radial section of the tire, which is preferred.

Another embodiment of the method according to the invention is provided, wherein the part of the tire to be wrapped is brought within the boundaries of the loop shaped guiding structure by opening the loop of the guiding structure and reclosing it.

The guiding structure may be positioned relative to the means for supporting the tire, but an embodiment of the method, wherein the loop of the guiding structure defines a plane, the means for supporting the tire are planar, and the plane of the loop extends perpendicular to the plane of the means for supporting the tire, is preferred because such an embodiment allows to increase production speed considerably.

A desirable embodiment of the invention provides a method wherein the tire is provided on its side to the means for supporting the tire. In this position the tire is stable when being wrapped and does not need additional support.

Although labels may be applied relatively loosely to a tire for identification, an embodiment of the method according to the invention comprises tensioning a label around the part of the tire after the label has been wrapped around that part. A label applied to a tire in accordance with this embodiment may be more easily printed with (additional) information after it has been wrapped around the tire.

Connecting opposed areas of the banding material at the neck of a wrapped loop may be accomplished by any means in the art, such as by adhesive bonding, knitting, stitching, welding, and other suitable methods. A preferred embodiment of the method according to the invention comprises connecting the opposed parts by welding. In such an embodiment, welding is preferably carried out by contacting the banding material with a hot wire or hot beam or rod. Such contact locally melts or softens the banding material and welds the opposed parts together. A preferred method of welding comprises ultrasonic welding.

The apparatus for providing a tire with an informative label comprises means for supporting a tire, means for supplying a banding material to the tire and wrapping it in a loop around a part of the tire, clamps for holding the banding material at the neck of said loop, and a device for welding opposed areas of the banding material at said neck.

The means for supplying a banding material typically comprise supply reels from which the banding material may be unrolled. It is possible to use a plurality of such reels and the banding material supplied from these reels may be welded together to form a continuous band to be wrapped around the tire.

In order to allow connecting two or more opposed areas of banding material, clamps for holding the banding material at the neck of a wrapped loop are provided, which clamps are preferably positioned adjacent the tire to be wrapped to allow a good fit. A suitable arrangement for the clamping means comprise two pairs of clamping jaws that are positioned at both sides of the area where the opposed parts of the banding material need to be connected. Since the connection, preferably a weld, is made between the two pairs of clamping jaws, the distance between them is preferably small enough to permit a proper seam to be made and prevent a change in the tightness of the loop after releasing the clamping jaws.

In a preferred embodiment of the method, the tire is compressed in a transverse plane to yield a decreased cross-sectional surface area of the tire before connecting opposed areas of the banding material at the neck. The apparatus is thereto provided with compression means that act in a transverse plane of the tire. This ensures that the wrap is tensioned around the tire when the compression is released. A close fit of the wrap around the tire ensues and this prevents undesirable sliding of the wrap.

In order to increase productivity, in particular reducing the holding time of the clamping means, required to produce a reliable welded connection, cooling means may be added to the apparatus for cooling a weld made.

In accordance with a further embodiment of the apparatus of the invention, the means for supplying a banding material to the tire and wrapping it in a loop around a part of the tire comprises a loop shaped guiding structure for the banding material.

An embodiment of the apparatus wherein the guiding structure is adapted to open its loop has the advantage of being able to wrap intricate parts of the tire by opening the loop, bringing in a part of the tire and closing the loop again, whereby opening and closing may be carried out a number of times to wrap a label or a plurality of labels in one operation.

A particularly suitable apparatus according to the invention relates to one wherein the guiding structure comprises at least two parts that can be separated to open the loop.

Another embodiment is directed to an apparatus having a guiding structure comprising at least two parts that form a loop and wherein the loop is interrupted by a permanent opening through which a tire can be brought into the loop. The banding material is then made to adhere to opposing positions of the guiding structure, which positions bridge the gap in the loop. Suitable means to transport the banding material are provided by (toothed) belts for instance. The banding material is made to adhere to the (toothed) belt by providing a vacuum pressure between the surface of the belt and the banding material.

In accordance with a further embodiment of the invention, an apparatus is provided wherein the loop of the guiding structure defines a plane, the means for supporting the tire are planar, and the plane of the loop extends perpendicular to the plane of the means for supporting the tire.

An embodiment of the apparatus according to the invention that allows a stable support for a tire comprises means for supporting the tire adapted to support a tire on its side. Suitable means comprise a conveyor for instance, preferably a roller conveyor. Since the tire is supported on its side no further support means are necessary although they may be used for further support.

In an other embodiment of the apparatus in accordance with the invention, the apparatus comprises means for tensioning a label after the label has been wrapped around the appropriate part of the tire. Such means for instance comprise a number of translatable tensioners that are adapted to capture the banding material and perform a translation to tension the gripped banding material.

A further embodiment of the invention provides an apparatus, wherein the connecting means comprise a welding device comprising a hot wire or hot rod or beam. A typical embodiment of such a connecting means comprises a support element carrying a taut hot wire of beam between two posts of the element and disposed at a spacing from the support element. The use of a hot wire or beam allows to provide a narrow yet strong connection between opposed parts of a wrapped banding material. Ultrasonic welding is also possible. The geometry of the rod or beam can be adapted to obtain a specific shape of the weld. Such a shape can be used as a logo, or can be functional in that an easily disrupted weld is obtained. Such a weld can for instance be made by leaving a central portion of the weld unconnected, such that a finger is easily introduced in this central portion and the weld disrupted.

The apparatus and method according to the invention allow to provide a tire with an informative label that comprises a banding material wrapped in a loop around a part of the tire and connected at the neck of said loop to form a wrap. The apparatus according to the invention allows to provide tires of different dimensions with an informative label.

In order to provide the information on the wrap, an embodiment of the apparatus comprises a printing unit. Tire specific information can in such an embodiment be printed on the wrap at the last moment if this should be required.

The apparatus in an embodiment is further provided with means to discard superfluous banding material, such as cutting means and the like.

In embodiments of the invention, a tire is provided wherein the informative label is essentially free of adhesives, wherein the front side of the informative label comprises a printed film, preferably a printed polypropylene film, and/or wherein the front side of the informative label comprises a pocket for receiving a printed information carrier.

Figure 2:
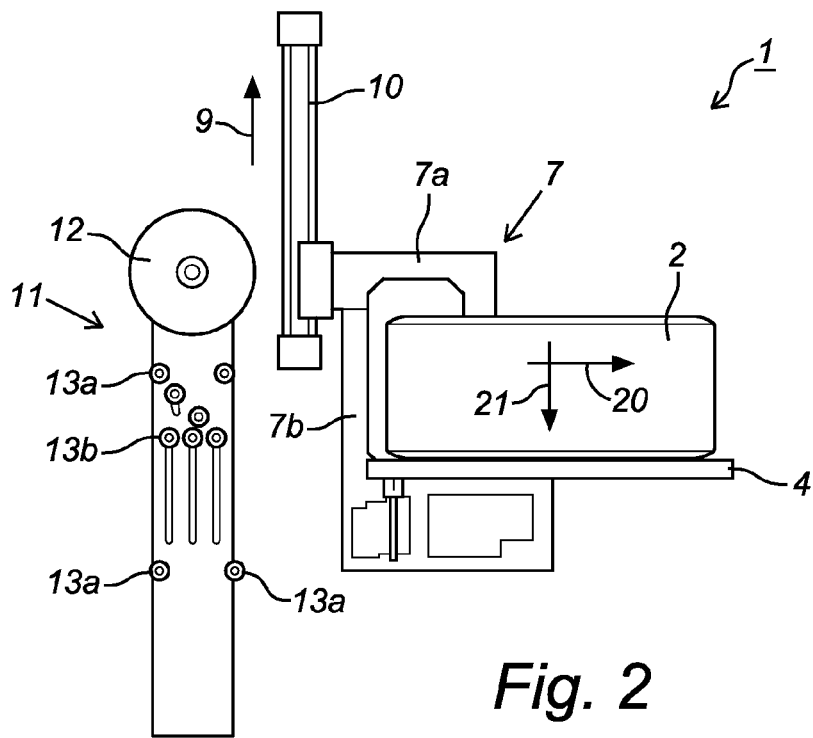
Figure 5:
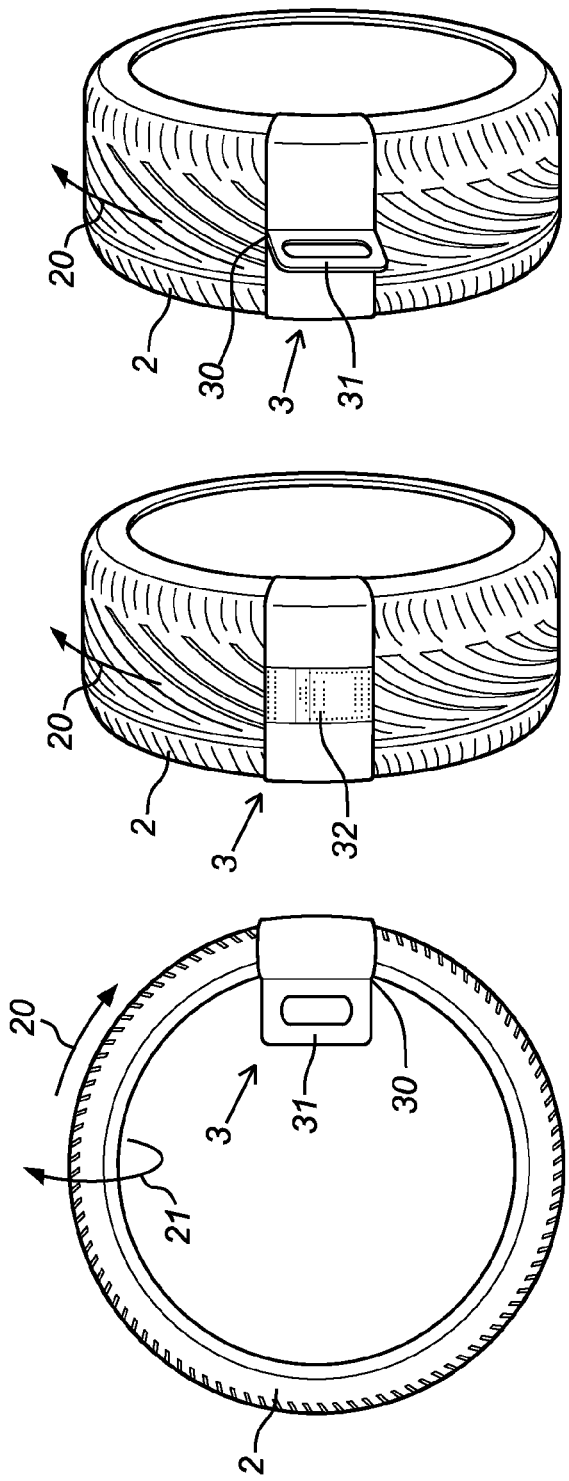
Figure 6:
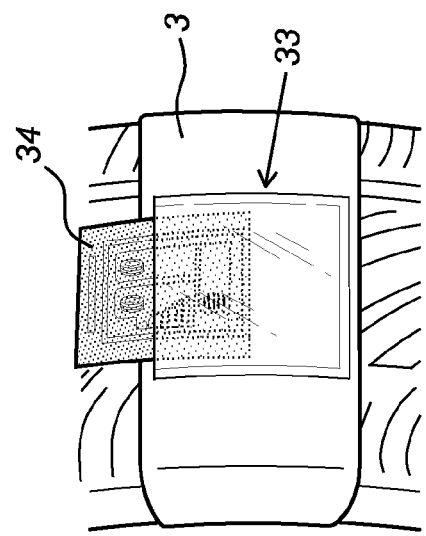
Figure 8:
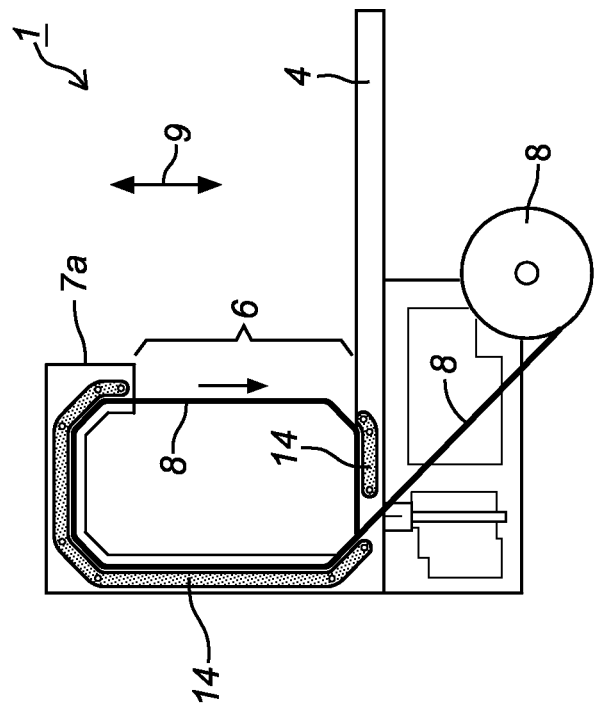
Figure 7:
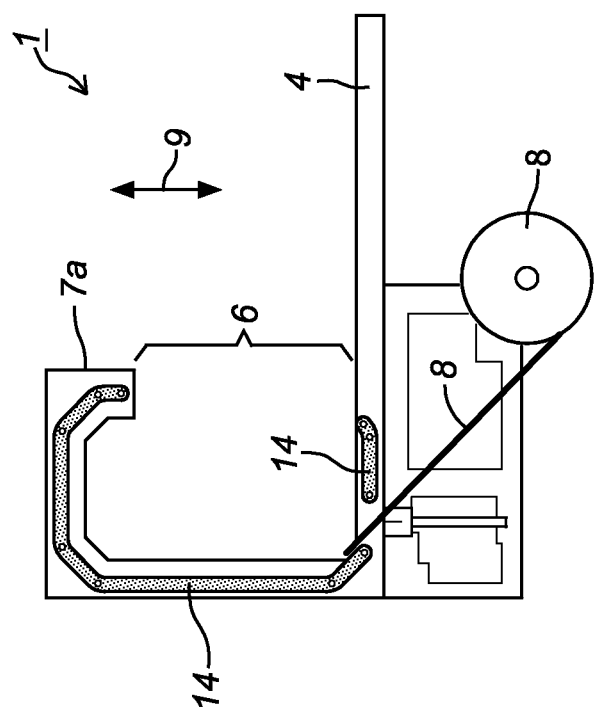

The invention will now be explained in more detail by a description of the accompanying figures, without however being limited thereto. In the figures:

FIG. 1 schematically shows a perspective view of an embodiment of the apparatus according to the invention;

FIG. 2 schematically shows a side view of the embodiment of FIG. 1;

FIG. 3 schematically shows a side view of the embodiment of FIG. 1 with the tire removed and the guiding means in open position;

FIG. 4 is a view taken in the direction of arrow IV of FIG. 2 on a different scale;

FIG. 5 schematically shows views of a tire provided with a label in accordance with the invention;

FIG. 6 schematically shows a perspective detailed view of an embodiment of a label in accordance with the invention;

FIG. 7 schematically shows a side view of another embodiment of the apparatus according to the invention; and FIG. 8 schematically shows a side view of the embodiment of FIG. 7 after the banding material has been looped around a tire.

Referring to FIGS. 1 and 2, an apparatus 1 for providing a tire 2 with an informative label 3 is shown. The apparatus 1 comprises means for supporting a tire 2 on its side in the form of roller conveyor 4, which progresses in the direction 5. The tire defines an axial direction 20 and a transverse or radial direction 21. Tires 2 that need to be provided with a label 3 are thus fed in the direction 5 whereby the roller converter 4 halts when a tire 2 has arrived in the vicinity of means for supplying a banding material 8 to the tire 2. The halting of the conveyor belt 4 may be achieved by any means known in the art, such as by an optic device. The means for supplying a banding material 8 to the tire 2 in the embodiment shown in FIGS. 1 and 2 comprise a guiding structure 7 that forms a loop in the closed position, shown in FIGS. 1, 2 and 4 and guides banding material 8 to be wrapped around the tire 2. The guiding structure 7 is adapted to open its loop by comprising two parts (7a, 7b) that can be separated to open the loop, as shown in FIG. 3. Opening of the loop is accomplished by translating movable part 7a along the vertical direction 9 upwards, for instance by connecting movable part 7a to a driven translating device 10, and allows a tire 2 to enter the loop formed by parts (7a, 7b). In the closed position, as shown in FIG. 4, movable part 7a is brought in its lowest position to form a substantially closed loop with fixed part 7b. The loop of the guiding structure 7 defines a vertical plane, that extends perpendicular to the plane of the roller conveyer 4 which extends substantially horizontal.

The apparatus 1 is further provided with means 11 for supplying banding material 8 under some tension. These means 11 typically comprise a supply reel 12 for banding material 8 (not shown in FIGS. 1 and 2) and a number of smaller rollers (13*a*, 13*b*) for guiding the banding material 8, and of which some 13*b* may be translatable in the vertical direction 9 to regulate the tension in the banding material 8.

As schematically shown in FIGS. 3 and 4, the guiding means 7 comprise a number of advancing conveyors 14 that are adapted to lead incoming banding material 8 around the loop formed by guiding parts (7*a*, 7*b*) in the closed position. When a complete loop of banding material has been formed around a part of a tire 2, preferably a radial part thereof (see FIG. 5), the opposite ends of the loop formed by the banding material 8 are held at the neck of said loop by the action of a clamping and welding device 15 (not shown in detail). Welding device 15 preferably comprises a hot wire or hot beam that, when contacting the banding material 8 melts or softens this material to fuse the opposing ends of the banding material loop. After welding, a label 3 is formed around the radial section of the tire in the form of a closed loop of banding material 8, and the tire can be removed out of the loop formed by the guiding means 7 by a forward movement of the roller conveyor 4 and by an upward movement of part 7*a* of the guiding means 7 to open the loop.

As schematically shown in FIGS. 7 and 8, another embodiment of the guiding means 7 comprises one guiding part 7*a* only, leaving a permanent gap 6 between the lower edge of guiding part 7*a* and the top surface of conveyor 4. The advancing conveyors 14 in the form of toothed belts for instance, transport the banding material 8 such that the banding material 8 is made to adhere to the toothed belts by providing a vacuum pressure between the surface of the belt and the banding material. The banding material 8 is made to close the gap 6 after a tire has been introduced through the gap 6, as shown in FIG. 8. Please note that the tire is not shown in FIG. 8 for clarity. The stiffness of the banding material 8 should be high enough in order to be able to close the gap 6 freestanding. When a complete loop of banding material has thus been formed around a part of a tire 2, the other steps are performed as already described above in the context of the description of FIGS. 3 and 4.

It is possible to tension a label after the label has been wrapped around the part of the tire and before welding it, for instance by the action of the rollers (13*a*, 13*b*) of supply means 11, or by other tensioning means. A preferred embodiment comprises compressing the tire 2 in a transverse plane (a plane parallel to the plane of the guiding means 7) before actually wrapping the banding material 8 around the tire 2. After welding the banding material 8, the compression is released which tensions the banding material 8 around the tire 2 in the transverse plane.

A tire 2, provided with an informative label 3 in accordance with the above described invention is shown in FIG. 5. The informative label 3 comprises banding material 8 wrapped in a loop around a radial section of the tire 2 and welded at the neck 30 of said loop. As shown in FIG. 5, the label 3 may extend further than the neck 30 to comprise a protruded part 31 for easy handling or better visibility. The informative label 3 is essentially free of adhesives and the front (visible) side of the informative label 3 comprises information such as represented by a printed film 32. The label 3 may have a relatively loose fit in which embodiment it is easily turned around the tire 2 radial section to bring a hidden part of the label 3 to the front side of the tire 2, as shown in the rightmost drawing of FIG. 5.

As shown in FIG. 6, the front side of the informative label 3 may also comprise a pocket 33 for receiving a printed information carrier 34, which carrier 34 may easily be removed from the label 3 or interchanged with another information carrier 34, carrying different information.

The invention claimed is:

1. Method for providing a tire with an informative label, the method comprising supporting a tire, supplying a banding material to the tire and wrapping the banding material in a loop around a part of the tire, holding the banding material at the neck of said loop, and connecting opposite ends of the banding material at said neck, wherein the banding material is guided around the part of the tire by guiding the banding material along a loop shaped guiding structure comprising a loop.

2. Method according to claim 1, wherein the part of the tire is brought within the boundaries of the loop shaped guiding structure by opening the loop of the guiding structure and reclosing the loop.

3. Method according to claim 1, wherein the loop of the guiding structure has a permanent opening through which a tire is introduced.

4. Method according to claim 1, wherein the loop of the guiding structure defines a plane, a means for supporting the tire is planar, and the plane of the loop extends perpendicular to the plane of the means for supporting the tire.

5. Method according to claim 1, wherein the tire is provided on its side to a means for supporting the tire.

6. Method according to claim 1, wherein a label is tensioned around the part of the tire after the label has been wrapped around that part.

7. Method according to claim 1, wherein a label is tensioned around the part of the tire by compressing the tire in a transverse direction, wrapping the label around the tire in the tire's compressed state, connecting the opposite ends of the banding material, and removing the compression.

8. Method according to claim 1, wherein the connecting is carried out by contacting the banding material with a hot wire or hot beam.

9. Method according to claim 1, wherein the part of the tire comprises a radial section of the tire.

10. Apparatus for providing a tire with an informative label, the apparatus comprising means for supporting a tire, means for supplying a banding material to the tire and wrapping the banding material in a loop around a part of the tire, clamps for holding the banding material at the neck of said loop, and a device for connecting opposite ends of the banding material at said neck, wherein the means for supplying a banding material to the tire and wrapping the banding material in a loop around a part of the tire comprises a loop shaped guiding structure for the banding material, the loop shaped guiding structure comprising a loop.

11. Apparatus according to claim 10, wherein the guiding structure is adapted to open the loop of the loop shaped guiding structure.

12. Apparatus according to claim 11, wherein the guiding structure comprises at least two parts that can be separated to open the loop of the loop shaped guiding structure.

13. Apparatus according to claim 10, wherein the loop of the guiding structure defines a plane, a means for supporting the tire is planar, and the plane of the loop extends perpendicular to the plane of the means for supporting the tire.

14. Apparatus according to claim 10, wherein the means for supporting the tire are adapted to support a tire on its side.

15. Apparatus according to claim 10, comprising means for tensioning a label after the label has been wrapped around the part of the tire.

16. Apparatus according to claim 10, comprising compression means for compressing the tire in a radial direction to obtain a smaller cross-sectional surface area than an uncompressed tire.

17. Apparatus according to claim 10, the connecting device thereof comprising a hot wire or hot beam.

* * * * *